United States Patent
Chen et al.

(10) Patent No.: US 6,850,360 B1
(45) Date of Patent: Feb. 1, 2005

(54) RAMAN AMPLIFIER SYSTEMS WITH DIAGNOSTIC CAPABILITIES

(75) Inventors: Chien-Jen Chen, Cupertino, CA (US); William S. Wong, San Jose, CA (US)

(73) Assignee: Bookham, Inc., San Jose, CA (US)

( * ) Notice: Subject to any disclaimer, the term of this patent is extended or adjusted under 35 U.S.C. 154(b) by 0 days.

(21) Appl. No.: 09/848,725

(22) Filed: May 4, 2001

Related U.S. Application Data

(60) Provisional application No. 60/283,632, filed on Apr. 16, 2001.

(51) Int. Cl.$^7$ .............................. H04B 4/08; H01S 3/00
(52) U.S. Cl. ..................... 359/334; 359/341.33; 398/21
(58) Field of Search ................................ 359/334, 110, 359/177, 341.33, 341.3; 398/21, 177; 356/73.1

(56) References Cited

U.S. PATENT DOCUMENTS

| | | | |
|---|---|---|---|
| 4,881,790 A | | 11/1989 | Mollenauer ............... 350/96.16 |
| 5,298,965 A | * | 3/1994 | Spirit et al. ................. 356/73.1 |
| 5,528,404 A | * | 6/1996 | MacKichan ................. 356/73.1 |
| 5,543,912 A | * | 8/1996 | Kada et al. ................. 356/73.1 |
| 5,623,508 A | | 4/1997 | Grubb et al. ................... 372/3 |
| 5,668,658 A | * | 9/1997 | Hamada ...................... 359/173 |
| 5,673,280 A | | 9/1997 | Grubb et al. ................... 372/3 |
| 5,724,126 A | * | 3/1998 | Nishi et al. ................. 356/73.1 |
| 5,724,149 A | * | 3/1998 | Stallard et al. ............. 359/110 |
| 5,903,375 A | * | 5/1999 | Horiuchi et al. ............ 359/130 |
| 5,959,750 A | | 9/1999 | Eskildsen et al. ........... 359/134 |
| 5,966,206 A | * | 10/1999 | Jander ....................... 356/73.1 |
| 5,986,782 A | * | 11/1999 | Alexander et al. .......... 359/110 |
| 6,052,393 A | | 4/2000 | Islam ............................ 372/6 |
| 6,081,323 A | * | 6/2000 | Mahgerefteh et al. ..... 356/73.1 |
| 6,101,025 A | * | 8/2000 | Naganuma .................. 359/134 |
| 6,115,174 A | | 9/2000 | Grubb et al. ............... 359/334 |
| 6,147,794 A | | 11/2000 | Stentz ........................ 359/334 |
| 6,151,160 A | | 11/2000 | Ma et al. .................... 359/341 |
| 6,163,636 A | | 12/2000 | Stentz et al. .................. 385/24 |
| 6,178,038 B1 | | 1/2001 | Taylor et al. ............... 359/341 |
| 6,181,464 B1 | | 1/2001 | Kidorf et al. ............... 359/334 |
| 6,275,313 B1 | | 8/2001 | Denkin et al. .............. 359/124 |
| 6,317,255 B1 | * | 11/2001 | Fatehi et al. ................ 359/177 |
| 6,342,965 B1 | * | 1/2002 | Kinoshita ................... 359/334 |
| 6,344,922 B1 | * | 2/2002 | Grubb et al. ............... 359/134 |
| 6,373,621 B1 | * | 4/2002 | Large et al. ................ 359/334 |
| 6,433,922 B1 | * | 8/2002 | Ghera et al. ................ 359/334 |
| 6,452,716 B1 | * | 9/2002 | Park et al. .................. 359/334 |
| 2001/0040719 A1 | * | 11/2001 | Okuno et al. ............... 359/334 |

FOREIGN PATENT DOCUMENTS

| | | |
|---|---|---|
| WO | WO 99/66607 | 12/1999 |
| WO | WO 00/49721 | 8/2000 |
| WO | WO 00/73849 A1 | 12/2000 |

OTHER PUBLICATIONS

G.P. Lees et al. "OTDR system using Raman amplificatin of a 1.65 um probe pulse." ELect. Lett. 33: Jun. 12, 1997, pp. 1080–1881.*

Sato et al. "A 1.6 um Band OTDR Using a Synchronous Raman Fiber Amplifier." IEEE Photonics Tech. Lett. 00:0 [?], Aug. 1992, pp. 923–924.*

(List continued on next page.)

Primary Examiner—Mark Hellner
(74) Attorney, Agent, or Firm—G. Victor Treyz

(57) ABSTRACT

Fiber-optic communications systems are provided for optical communications networks. Fiber-optic communications links may be provided that use spans of transmission fiber to carry optical data signals on wavelength-division-multiplexing channels at different wavelengths. Raman pump light may be used to provide Raman amplification for the optical data signals. The Raman pump light may be used to make measurements on the spans of transmission fiber. Raman pump light may be modulated to make optical time domain reflectometry measurements and measurements of the Raman gain coefficient in the fiber. Information on the measurements made using the Raman pump light may be used to control the Raman pump light during operation of the communications link and may be provided to a network management system.

2 Claims, 17 Drawing Sheets

OTHER PUBLICATIONS

Spirit et al. "Raman Assisted Long–Distance Optical Time Domain Reflectometry." Elect. Lett. 25:25, Dec. 1989, pp. 1687–1689.*

Sato et al. "1.6 um Band Coherent Optical Time Domain Reflectometry." Instrumentation and Measurement Technology Conference Proceedings, May 1994, pp. 102–105.*

Izumita et al. "1.65–nm [sic] Brillouin optical time domain reflectometry employing a Raman fiber amplifier and a lithium niobate phase modulator." OFC '97 Tech. Digest, pp. 159–160.*

Horiguchi et al. "Stimulated Raman Amplification of 1.6–um–Band Pulsed Light in Opticla Fibers." IEEE Photonics Tech. Lett. 4:1, Jan. 1992.*

Zhu et al. "1.28 Tbit/s (32 × 40 Gbit/s) Transmission over 1000 km NDSF Employing Distributed Raman Amplification and Active Gain Flattening" Electronics Letters, vol. 37, No. 1, p. 43–45 (Jan. 4, 2001).

Emori et al. "Cost–Effective Depolarization Diode Pump Unit Designed for C–band Flat Gain Raman Amplifiers to Control EDFA Gain Profile" p. 106–108.

Takeda et al. "Active Gain Tilt Equalization by Preferentially 1.43$\mu$m– or 1.48$\mu$m– Pumped Raman Amplification" OSA Optical Amplifiers and their Applications, vol. 30, p. 101–105 (1999).

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Fludger et al. "Inline Loopbacks for Improved OSNR and Reduced Double Rayleigh Scattering in Distributed Raman Amplifiers" OFC.

Stentz "Progress on Raman Amplifiers" OFC '97 Technical Digest, p. 343.

Hansen et al. "Raman Amplification for Loss Compensation in Dispersion Compensating Fibre Modules" Electronics Letters, vol. 34, No. 11, p. 1136–1137, May 28, 1998.

Emori et al. "Broadband Lossless DCF using Raman Amplification Pumped by Multichannel WDM Laser Diodes" Electronics Letters, vol. 34 , No. 22, Oct. 29, 1998.

Hoshida et al. "Performance Prediction Method for Distributed Raman Amplification in Installed Fiber Systems Based on OTDR Data" OFC 2001 Technical Digest.

Mahgerefteh et al. "Novel In–Fiber Technique for Measurement of the RAMAN Gain Coefficient" OFC '97 Technical Digest, p. 188–189.

Fludger et al. "Pump to Signal RIN Transfer in Raman Fibre Amplifiers" Electronics Letters, vol. 37, No. 1, p. 15–17, (Jan. 4, 2001).

Neilson et al. " 10 Gbit/s Repeaterless Transmission at 1.3 $\mu$m with 55.1–dB Power Budget using Raman Post and Preamplifier" OFC '98 Technical Digest, p. 52–53.

* cited by examiner

RAMAN AMPLIFIER SYSTEMS WITH DIAGNOSTIC CAPABILITIES

This application claims the benefit of provisional patent application No. 60/283,632, filed Apr. 16, 2001.

BACKGROUND OF THE INVENTION

The present invention relates to fiber-optic communications networks, and more particularly, to Raman amplifier systems for fiber-optic communications links.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

It is an object of the present invention to provide optical amplifier systems that use Raman pumps to pump transmission fiber spans to create distributed Raman amplification.

It is also an object of the present invention to provide optical amplifier systems that use Raman pumps to perform optical measurements that provide information on system characteristics.

SUMMARY OF THE INVENTION

These and other objects of the invention are accomplished in accordance with the present invention by providing optical communications systems for fiber-optic networks. Fiber-optic communications links may be provided that use Raman amplification to amplify optical data signals. Raman amplification may be provided using Raman pumps to provide pump light to the transmission fiber spans in the link.

The Raman pumps may be used in a counterpumping configuration in which Raman pump light travels backwards in the transmission fiber spans. During a setup procedure or during use of the Raman pump in a system, the Raman pump light may be modulated and the corresponding backscattered light for the spans may be monitored to make measurements on the spans. For example, the Raman pump light may be modulated to create pulses that may be used to make optical time domain reflectometry measurements. This arrangement may be used to identify possible faults and other features in a given span and to characterize the fiber type. The Raman pump light may also be used to measure the Raman gain coefficient for the fiber. Information on the measured Raman gain coefficient and other fiber characteristics may be used in adjusting the power of the Raman pump to a proper level.

Information gathered by measuring backscattered Raman pump light may be provided to a network management system.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
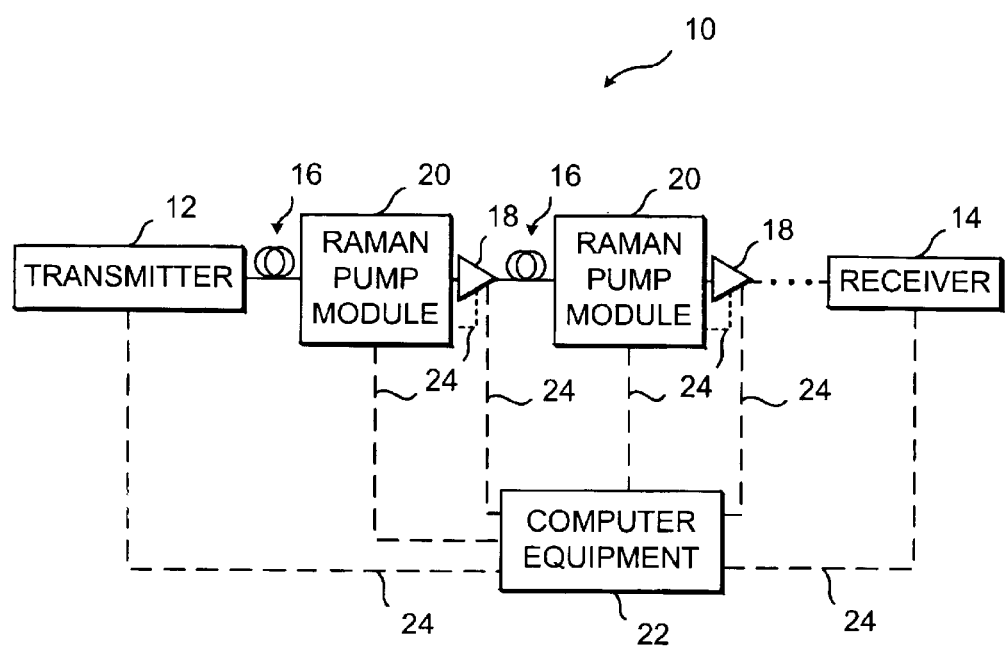
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be part of a fiber ring network or any other suitable network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths (e.g., using optical go code division multiple access (CDMA) arrangements), signals may be modulated at slower or faster data rates (e.g., at approximately 2.5 Gbps for OC-48 or at approximately 40 Gbps for OC-768), and different carrier wavelengths may be supported (e.g., wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Raman pump modules 20 may be used to provide Raman pump light to spans 16. The Raman pump light creates Raman gain in fiber spans 16 through stimulated Raman scattering. Each Raman pump module may provide pump light at one or more wavelengths using sources such as laser diode sources, fiber lasers, or other suitable sources of pump light. Although the arrangement of FIG. 1 involves the counterpumping of spans 16 with Raman pump light, spans 16 may be copumped with Raman pump light if desired.

Computer equipment 22 may be used to implement a network management system. Computer equipment 22 may be located at network nodes and/or a network management facility. As indicated by lines 24, the network management system may communicate with optical amplifiers 18, transmitter 12, receiver 14, Raman pump modules 20, and other optical network equipment using suitable communications paths. The communications paths may be based on any suitable optical or electrical paths. For example, the communications paths 24 may include service or telemetry channel paths, may include wired or wireless communications paths, may involve communications paths formed by slowly modulating the normal data channels on link 10 at small modulation depths, etc. Paths 24 may also be used for direct communications between Raman pump modules 20 and optical amplifiers 18.

Link 10 may also include optical network equipment modules such as add/drop modules, optical switches, dispersion compensation modules, dynamic filter modules, or any other suitable optical network equipment.

Figure 2:
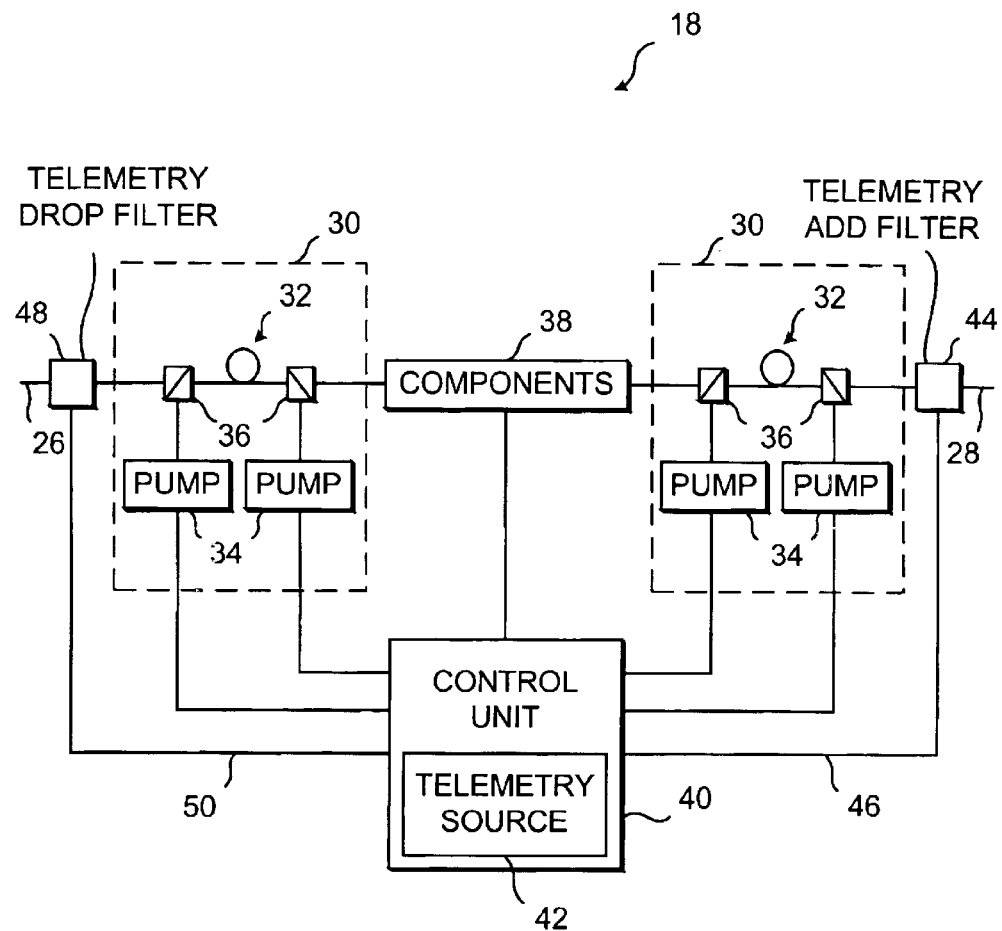
FIG. 2 is a schematic diagram of an illustrative optical amplifier in accordance with the present invention.

An illustrative optical amplifier 18 is shown in FIG. 2. Amplifier 18 may receive optical signals from a span of fiber 16 at fiber input 26. Corresponding amplified output signals may be provided at fiber output 28 for launching on a subsequent span of transmission fiber 16.

In the example of FIG. 2, optical gain is provided by gain stages 30. Gain stages 30 may include optically-pumped erbium-doped fiber 32 or other rare-earth-doped fiber or Raman fiber. Fiber 32 may be pumped using one or more pumps 34. Pumps 34 may be based on one or more laser diodes operating at wavelengths of 980 nm or 1480 nm or other suitable wavelengths or any other suitable sources of pump light. Pump light from pumps 34 may be coupled into fiber coils 32 using pump couplers 36. Pump couplers 36 may be wavelength-division-multiplexing couplers or any other suitable couplers. The pumping configuration shown in FIG. 2 involves both copumping and counterpumping. If desired, however, coils 32 may be only copumped or only counterpumped.

Although amplifier 18 of FIG. 2 is shown as having two coils of erbium-doped fiber, this is merely illustrative. Amplifiers 18 may have one, two, three, four, five, or more coils of erbium-doped fiber or other rare-earth-doped fiber. In amplifiers 18 that include optically-pumped Raman gain stages or gain stages based on other gain media, one, two, three, or more of such gain stages may be provided. Any suitable number of erbium-doped fiber gain stages, Raman gain stages, semiconductor gain stages, or other gain stages may be combined in any suitable order in amplifier 18. Amplifier topologies other than the amplifier topology of FIG. 2 may be used if desired. Amplifiers 18 may also be omitted from some or all of the nodes of link 10. Amplification for the optical signals may be provided by Raman pump modules 20 at those nodes.

Components 38 may be positioned at various locations along the main fiber path through amplifier 18. Components 38 may include isolators, taps and photodetectors for optical monitoring, filters (e.g., dynamic and static spectral filters), wavelength-division-multiplexing couplers, attenuators, dispersion-compensating elements such as dispersion-compensating fiber, gain stages, pumps, etc.

The operation of components 38 and pumps 34 may be controlled using control unit 40. Control unit 40 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Control unit 40 may include communications circuitry that supports communications with a network management system implemented using computer equipment 22 over paths 24. As shown in FIG. 2, control unit 40 may include a telemetry source 42 such as a diode laser. Source 42 may be used to transmit information over a telemetry channel. Telemetry channel transmissions at the telemetry channel wavelength may be provided by source 42 to telemetry add filter 44 over fiber 46. Telemetry add filter 44 may merge the telemetry channel transmissions into the main fiber path through amplifier 18, so that both the telemetry channel transmissions and the normal data traffic on link 10 are provided at output fiber 28 for transmission over the next fiber span 16.

A telemetry drop filter 48 may be used to separate telemetry channel signals from the optical signals provided to input fiber 26. The normal data signals (e.g., the data signals on the wavelength-division-multiplexing channels on link 10) pass through filter 48 to the fiber 32 in the first gain stage 30. The telemetry channel signals from the previous amplifier 18 or other equipment in link 10 that have been separated from the main fiber path may be provided to control unit 40 over fiber 50. Because a typical link 10 has a series of amplifier 18, telemetry channel communications may be supported along the entire length of link 10. Telemetry channel communications in the reverse direction may be supported using a parallel link in which signals travel in the opposite direction to the signals in link 10. The amplifiers 18 in each link may be interconnected using local electrical paths between the links.

Figure 3:
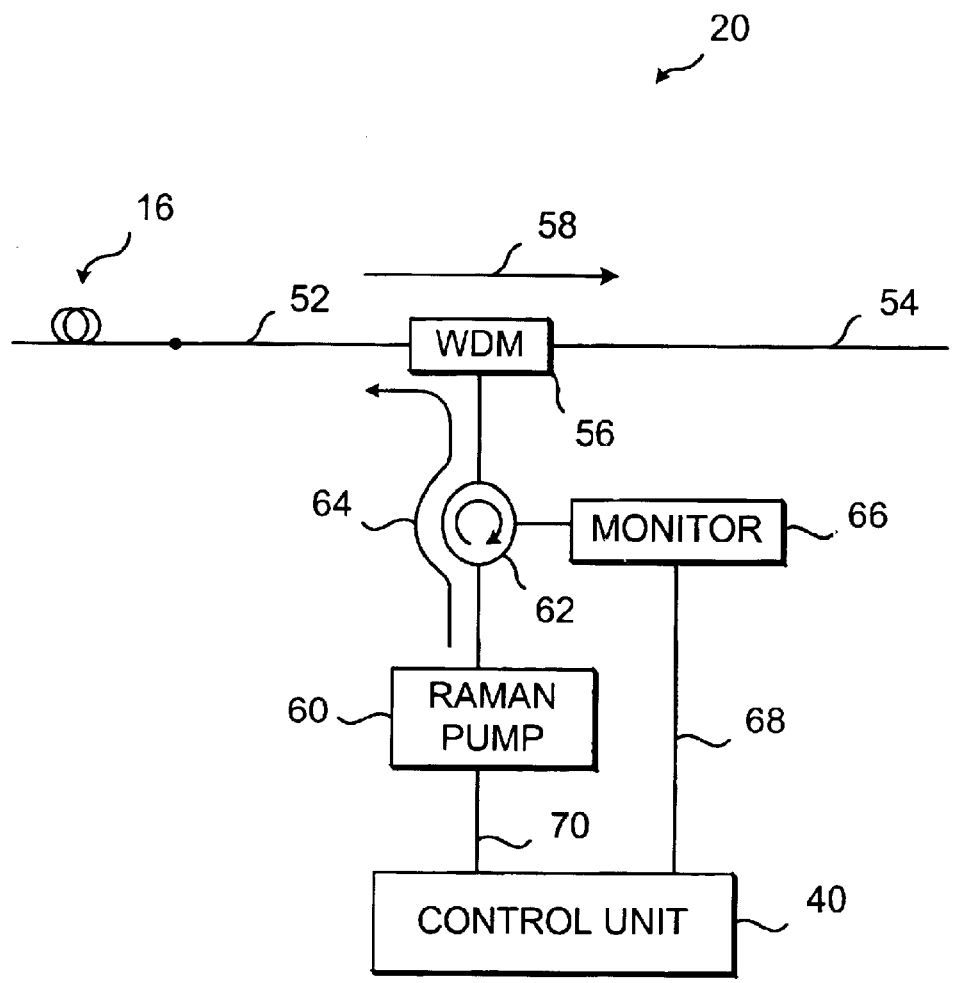
FIG. 3 is a schematic diagram of illustrative Raman pump equipment in accordance with the present invention.

An illustrative Raman pump module 20 is shown in FIG. 3. Fiber input 52 may be connected to a preceding span of fiber 16, as shown in FIG. 1. Output fiber 54 may be connected to an erbium-doped fiber amplifier or other suitable amplifier 18 that is located at the same network node as Raman pump module 20. The output of the amplifier may then be connected to the next fiber span 16 in link 10.

Light in the signal band (e.g., signal light on the wavelength-division-multiplexing channels on link 10) that is provided to input fiber 52 may pass through wavelength-division-multiplexing coupler 56, as shown by line 58.

Raman pump 60 may produce Raman pump light. Raman pump 60 may contain one or more laser diodes or other suitable sources of pump light. Raman pump light may be generated at a single wavelength or at multiple wavelengths. In general, the pump light wavelengths are about a Stokes shift in wavelength below the wavelength band for the signals. The Raman pump light from pump 60 may be launched into the preceding fiber span 16 in the backwards direction. Raman pump light from pump 60 may be directed into fiber 16 through circulator 62 and wavelength-division-multiplexing coupler 56, as indicated by line 64. In span 16, the backwards-propagating Raman pump light produces Raman gain in the signal band through stimulated Raman scattering.

Some of the Raman pump light is backscattered. The backscattered light travels in the same forwards direction as the signal light. When the backscattered pump light reaches wavelength-division-multiplexing coupler 56, the light is directed to circulator 62 by wavelength-division-multiplexing coupler 56. Circulator 62 directs the backscattered light from coupler 56 into optical monitor 66. Optical monitor 66 may be any suitable optical monitor such as a monitor that includes one or more photodetectors that convert optical signals into current signals and transimpedance amplifier circuitry that converts the current signals into voltage signals for processing by the circuitry of control unit 40. This is merely an illustrative arrangement for monitor 66. Any suitable optical monitor arrangement may be used if desired.

Control unit 40 may receive information from monitor 66 over electrical path 68. Control unit 40 may control Raman pump 60 over electrical path 70.

Control unit 40 of FIG. 3 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

The same control unit 40 may be used to control Raman pump module 20 and optical amplifier 18. If the same control unit is used, the components of Raman pump module 20 and amplifier 18 may be housed in a common housing or structure or separate structures that are electrically and optically interconnected. If desired, Raman pump module 20 and optical amplifier 18 may have separated control units. If separate control units are used, the control units may communicate directly with each other. Separate control units may also communicate using computer equipment 22. These are merely illustrative examples. Raman pump module 20 and optical amplifier 18 may be controlled using any suitable control unit electronics.

Figure 4:
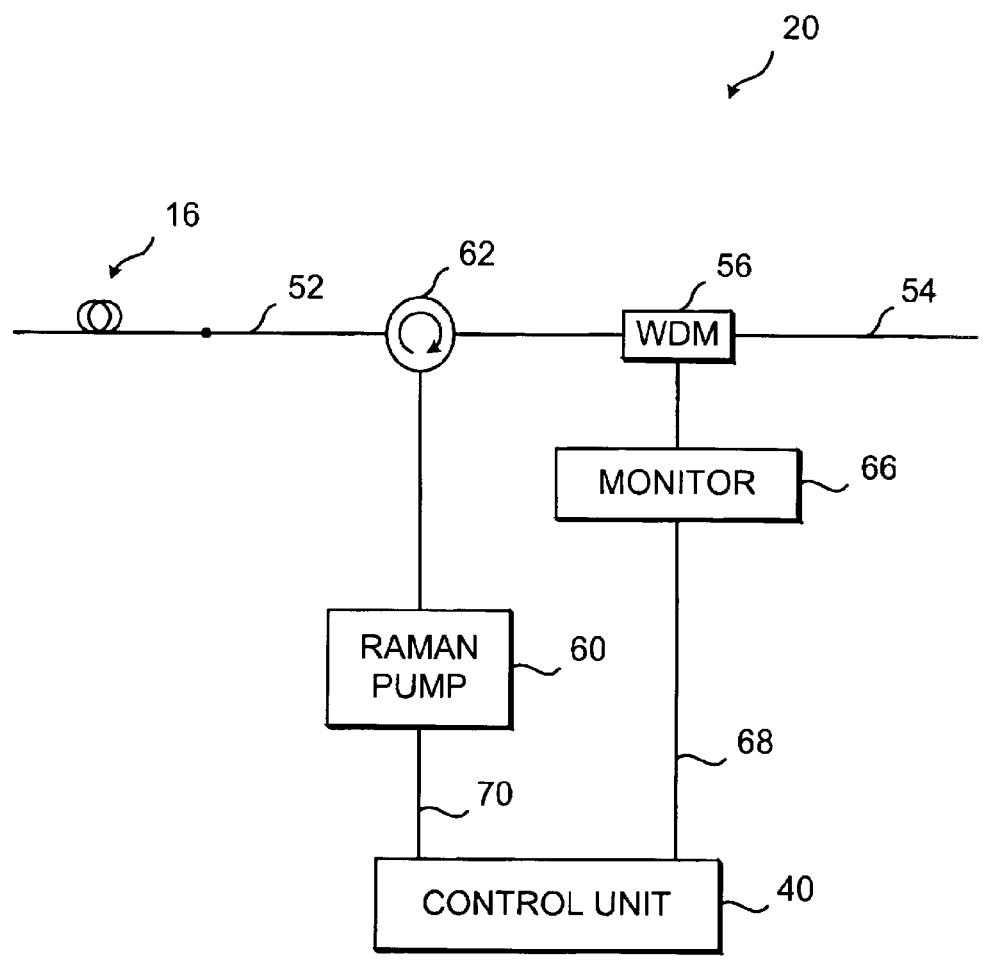
FIG. 4 is another schematic diagram of illustrative Raman pump equipment in accordance with the present invention.

Moreover, the optical configuration of FIG. 3 is merely illustrative. Other configurations may be used to measure backscattered light from fiber 16 if desired. Another illustrative configuration for pump module 20 is shown in FIG. 4. In the example of FIG. 4, data signals from fiber span 16 are provided to input 52. These data signals are directed to output fiber 54 through circulator 62 and wavelength-division-multiplexer 56. Raman pump light from pump 60 is directed into fiber span 16 through circulator 62.

Backscattered Raman pump light from fiber 16 is directed to monitor 66 by circulator 62 and wavelength-division-multiplexer 56. Control unit 40 receives information on the backscattered signal power from monitor 66 and controls Raman pump 60 using paths 68 and 70, respectively.

Regardless of the particular arrangement used to measure backscattered light from Raman pump 60, this light may be used to perform measurements on span 16. As an example, Raman pump 60 may be used to perform optical time domain reflectometry measurements. Raman pump measurements may provide information on the status and nature of fiber span 16.

One way in which optical measurements may be made with pump 60 is to make measurements during a system set up or diagnostics period or other suitable time in which full use of Raman pump 60 is not needed to provide Raman amplification. In this situation, control unit 40 may modulate pump 60 to produce a series of pulses such as pulses 72 of FIG. 5. The duration τ of each pulse may be relatively short, to provide good spatial resolution in optical time domain reflectometry measurements. For example, the duration τ may be about 5–25 ns, 1–200 ns, 1–500 ns or other suitable duration. The frequency $f_1$ with which the series of pulses is provided may be selected to be low enough to ensure that each pulse 72 and the backscattered signals from that pulse have completely exited the fiber span 16 being measured before a subsequent pulse is launched. Because the round trip transit time for light in a fiber is about 10 μs/km, pulse train frequencies of less than about 1 kHz or less may generally be used for fiber spans of up to 100 km in length. This frequency may be lowered to accommodate longer span lengths if desired. Faster modulation frequencies (e.g., 2 kHz, 5 kHz, or more) may be used for shorter span lengths or when the effects of multiple simultaneous backwards propagating pulses in fiber 16 are taken into account when processing the backscattered signals.

As each pulse 72 is launched from pump 60 into span 16, control unit 40 uses monitor 66 to gather information on the backscattered signal. Because a single-shot measurement may be noisy, control unit 40 may make repeated measurements by averaging the return signal from each pulse 72 in the series of pulses. Any suitable signal acquisition and averaging period may be used. For example, the reflected signals from one or a few pulses may be averaged, or the reflected signals from tens, hundreds, thousands, tens of thousands or more pulses may be averaged. Data acquisition and averaging may also be performed over time periods of a few seconds, a few minutes, or longer time periods.

Figure 5:
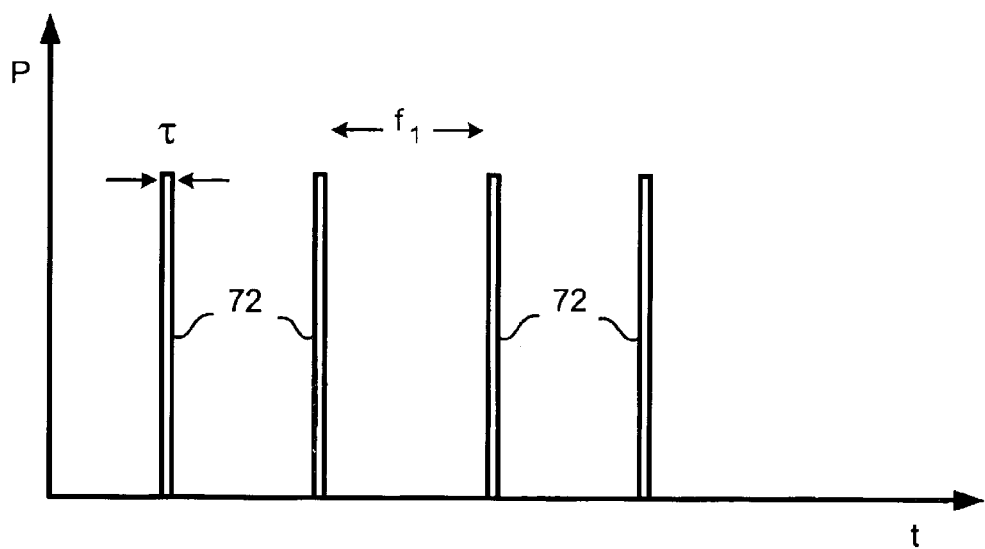
FIG. 5 is a graph showing how the Raman pump power of a given Raman pump may be modulated for use in performing time domain reflectometry measurements in accordance with the present invention.
Figure 6:
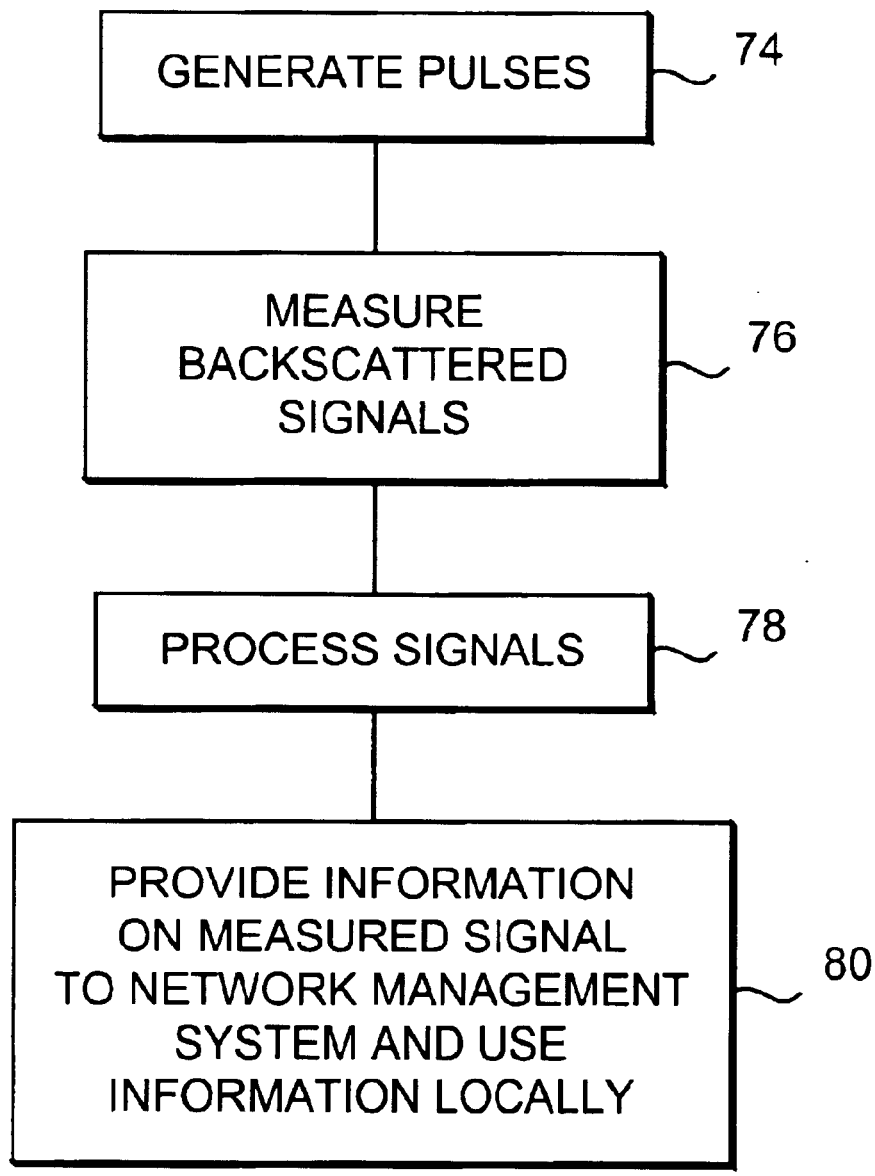
FIG. 6 is a flow chart of illustrative steps involved in using Raman pumps to perform link characterization measurements in accordance with the present invention.

Illustrative steps involved in using Raman pump 60 to perform optical time domain reflectometry measurements are shown in FIG. 6. At step 74, control unit 40 may uses Raman pump 60 to generate a pulse or series of pulses as shown in FIG. 5. Control unit 40 may use optical monitor 66 to measure the backscattered signals from these pulses at step 76.

At step 78, the measured signals may be processed. As one example, the measured signals may be processed using data averaging techniques. To minimize the amount of memory that is used by control unit 40 in processing the measured signals, a moving average technique may be used in which data for newly acquired signal traces is averaged into an existing stored data. Filtering techniques, histograms, curve fitting, and other data reduction and analysis tools may also be used by control unit 40 in processing the acquired information on the backscattered signals.

After control unit 40 has gathered sufficient information on the backscattered signals at step 78, information on the backscattered signals may be provided to computer equipment 22 or may be used locally by control unit 40 at step 80 (e.g., as a basis for adjusting pump 60). The information may include optical time domain reflectometry (OTDR) trace data and other information that characterizes span 16. Control unit 40 may provide this information to the network management system that uses computer equipment 22 over paths 24. Such paths may, for example, include a telemetry channel path. Telemetry channel communications between control unit 40 and the network management system may be supported using the telemetry capabilities of amplifiers 18 or pump modules 20 may be provided with telemetry channel capabilities. Control unit 40 may provide OTDR information to the network management system in the form of alarms, reports, data files, as part of a data stream, or using any other suitable formats.

The network management system implemented using computer equipment 22 may use the optical time domain reflectometry traces and other information in evaluating the characteristics of span 16. For example, if control unit 40 is used to make optical time domain reflectometry measurements before the link 10 is placed in service or when link 10 is being upgraded or repaired, the personnel at the network management system computer equipment 22 may use the measurements to identify various features in the span. Control unit 40 may also adjust the operating settings of Raman pump module 20 based on the information gathered during the optical time domain reflectometry measurements. If desired, the information gathered during the optical time domain reflectometry measurements may be used locally by control unit 40 in automatically adjusting the operation of pump module 20 to produce a desired gain setting. If a fiber cut or a disconnected connector is detected by the optical time domain reflectometry measurements, the control unit may immediately reduce the pump power of the Raman pump to an eye safe level or may turn off the Raman pump completely.

Figure 7:
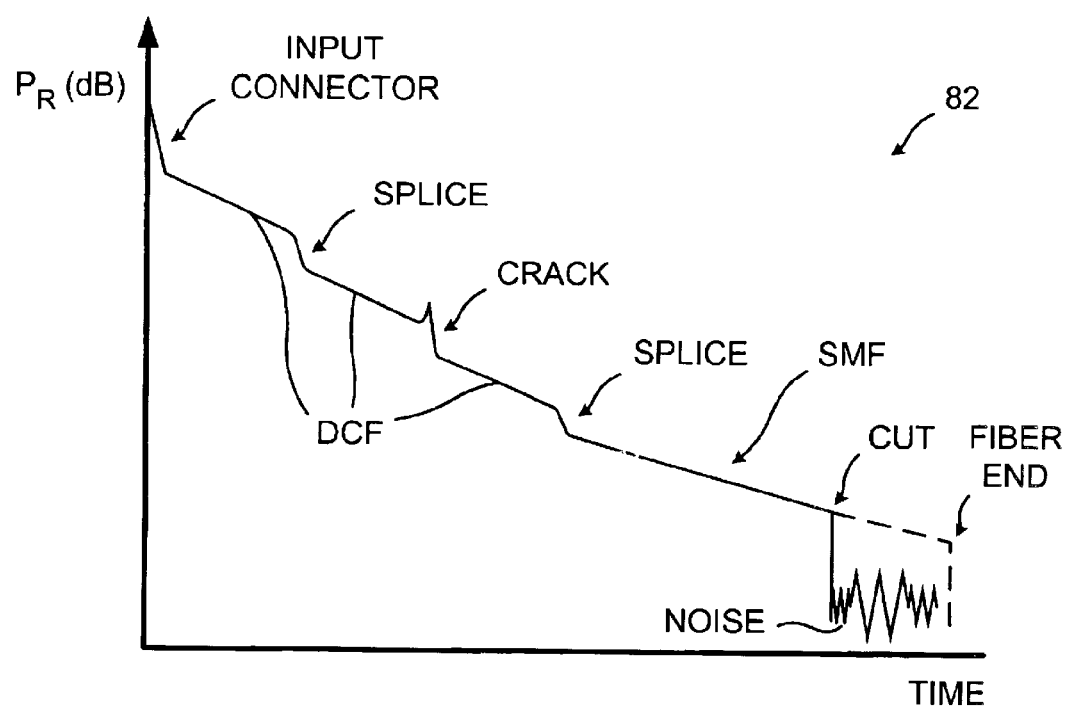
FIG. 7 is a graph of an illustrative optical time domain reflectometry trace measured using a Raman pump in accordance with the present invention.

An illustrative optical time domain reflectometry trace 82 that may be acquired by control unit 40 using Raman pump 60 and monitor 66 is shown in FIG. 7. In the example of FIG. 7, the reflected signal power (i.e., the reflected pump power from pump 60) has been plotted as a function of time. If desired, the time scale on the x-axis of the graph of FIG. 7 may be converted into a distance scale based on the known characteristics of fiber span 16 such as the group velocity. The y-axis (power) in FIG. 7 is plotted on a log (dB) scale.

Trace 82 shows a number of features that are present in an illustrative fiber span 16. For example, the presence and locations of splices, cracks, cuts, and connectors may be determined. When control unit 40 detects a fault such as a crack or an improperly disconnected connector, control unit 40 may generate an alarm and may reduce the power of pump 60 (e.g.; to zero or another eye safe level). The total length of the fiber span 16 may also be measured when no cuts are present.

Trace data may also be used to identify the fiber in span 16. Different fiber types may be used for different sections of span 16. For example, span 16 may contain standard single mode fiber (SMF) or dispersion-compensating fiber (DCF) or other fiber types. Different types of fiber may be characterized by their loss per unit length and effective core areas ($A_{EFF}$). When trace 82 is plotted on a log scale, as in FIG. 7, the slope of trace 82 in a given region is inversely related to the value of $A_{EFF}$). In the example of FIG. 7, two fiber types—SMF and DCF—were used in different portions of span 16, as evidenced by the characteristic slopes. Information on the fiber type or types in span 16 may be used by control unit 40 and the network management system in determining the appropriate pumping powers and other settings for pump modules 20 and amplifiers 18.

If desired, taps and monitors may be used in equipment 20 to measure the signals power on span 16 at various Raman pump levels. This allows control unit 40 to gather information on the on-off Raman gain produced by pump modules 20. The results of such on-off gain measurements may be combined with the results of optical measurements made at the pump wavelengths to further characterize span 16.

Figure 8:
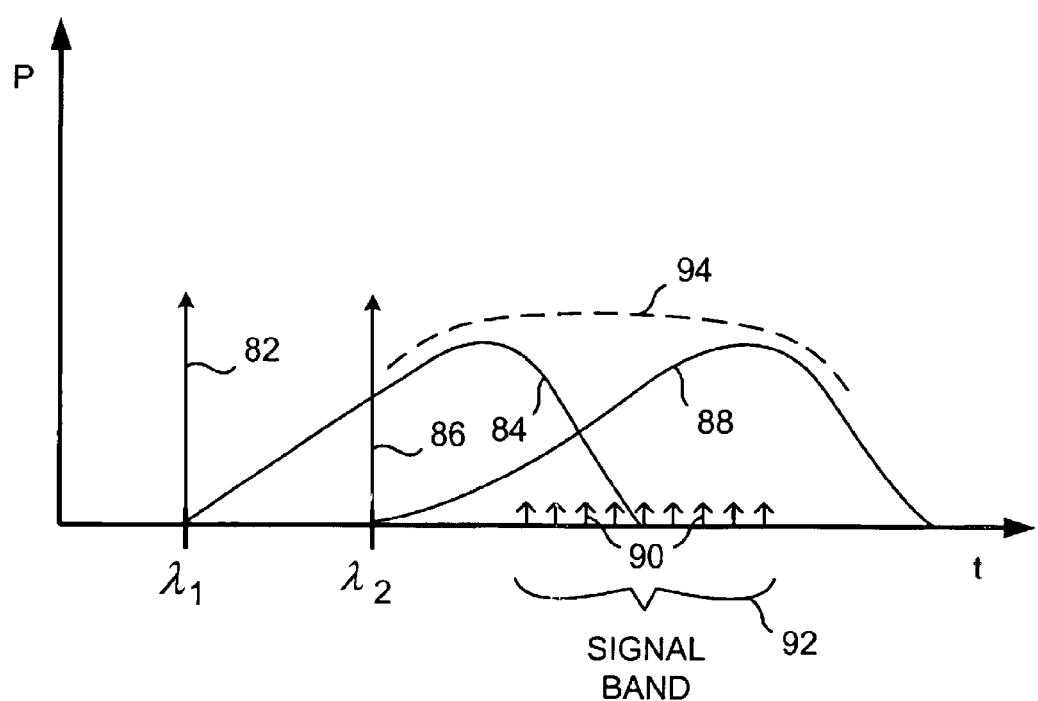
FIG. 8 is a graph showing how an illustrative Raman pump may provide multiple pump wavelengths in accordance with the present invention.

Pump 60 may contain laser diodes or other pump sources that operate at multiple wavelengths. If desired, the powers of the pump wavelengths may be individually controlled to make measurements on fiber span 16. As shown in FIG. 8, an illustrative pump 60 may produce Raman pump light at two wavelengths $\lambda_1$ and $\lambda_2$. The pump light 82 at $\lambda_1$ produces Raman gain spectrum 84 in fiber span 16. The pump light 86 at $\lambda_2$ produces a Raman gain spectrum 88. Gain spectra 84 and 88 produce an overall Raman gain spectrum 94 that amplifies signals 90. Because more than one wavelength of pump light is used, the shape of gain spectrum 94 may be flatter than would be possible if only a single wavelength were used. If desired, three, four, five, six, or more different pump wavelengths may be used to produce a desired Raman gain shape. Only two pump wavelengths are shown in the example of FIG. 8 for clarity.

Because the light 82 at $\lambda_1$ produces Raman gain for the light 86 at $\lambda_2$, a pump and probe arrangement may be used to characterize fiber span 16. With this type of arrangement, light 86 may be pulsed to perform optical time domain reflectometry measurements while light 82 is modulated to measure the effect of adjusting Raman gain curve 84. This technique does not require any normal data signals to be present in the signal band on link 10.

Figure 9:
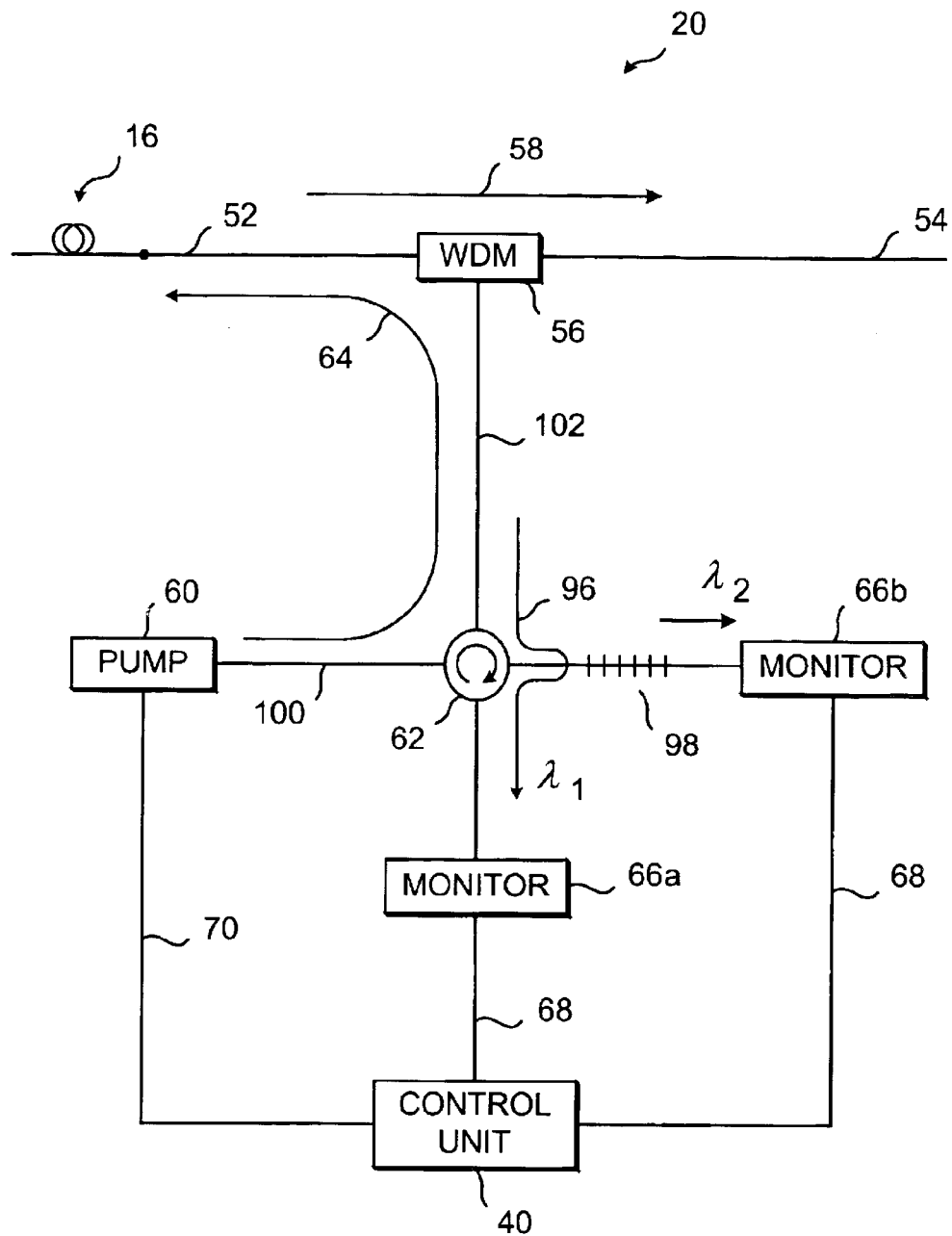
FIG. 9 is a schematic diagram of illustrative Raman pump equipment that may be used to pump a transmission fiber span and that may be used to measure reflected signals at multiple wavelengths in the pump band in accordance with the present invention.

An illustrative Raman pump module 20 that may be used for this type of measurement approach is shown in FIG. 9. In pump module 20 of FIG. 9, pump light at 1 and 2 may be directed into fiber 16 via fiber 100, four-port circulator 62, fiber 102, wavelength-division-multiplexing coupler 56, and the fiber of fiber input 52. Optical signals in the signal band pass through wavelength-division-multiplexer 56 to fiber output 54 in forwards direction 58. Backscattered pump light signals at $\lambda_1$ and $\lambda_2$ that are propagating back from fiber 16 in direction 58 are directed to fiber 102 by coupler 56. Circulator 62 directs the backscattered signals to a reflector or filter 98. Filter 98 may be a fiber Bragg grating filter or other suitable filter that passes light at $\lambda_{22}$ and that reflects light at $\lambda_1$. The power of the light at $\lambda_2$ may be measured by optical monitor 66b. As indicated by line 96, light at $\lambda_1$ is reflected from filter/reflector 98 into circulator 62, which directs the light at $\lambda_1$ to monitor 66a.

Control unit 40 may receive information on the measured signal powers for the light at $\lambda_1$ and $\lambda_2$ from monitors 66a and 66b over paths 68. Control unit may communicate with pump 60 over path 70.

Figure 10:
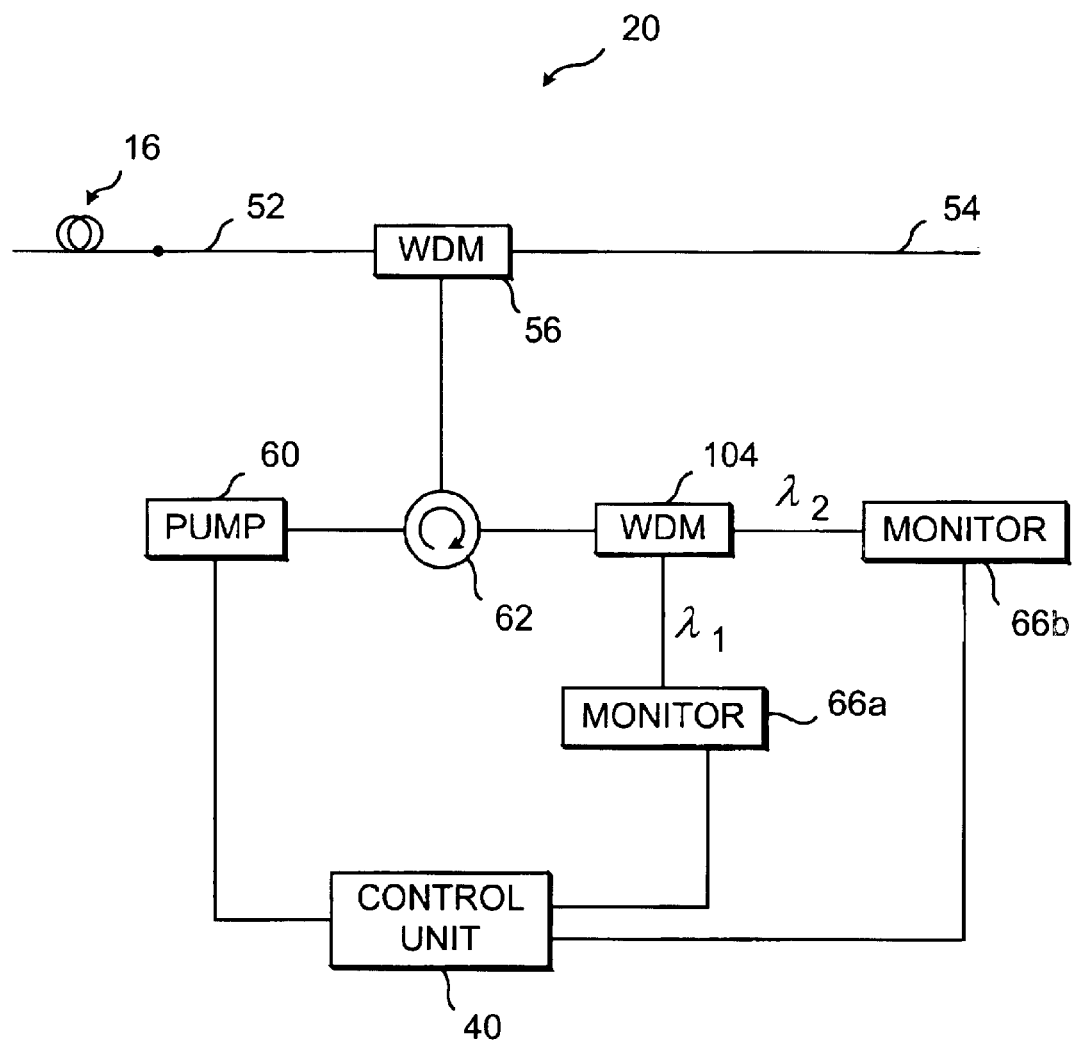
FIG. 10 is another schematic diagram of illustrative Raman pump equipment that may be used to pump a transmission fiber span and that may be used to measure reflected signals in the pump band in accordance with the present invention.

Another illustrative example is shown in FIG. 10. With pump module 20 of FIG. 10, pump light from pump 60 is directed toward fiber 16 by three-port circulator 62 and wavelength-division-multiplexing coupler 56. Signal light in the signal band passes through coupler 56 from input 52 to output 54. Backscattered pump light from fiber 16 is directed to circulator 62 by coupler 56. The backscattered light may be divided into separate wavelength bands using wavelength-division-multiplexing coupler 104. For example, light at $\lambda_2$ may be directed to monitor 66b by coupler 104, whereas light at $\lambda_1$ may be directed to monitor 66a by coupler 104.

The arrangements of FIGS. 9 and 10 are merely illustrative. Any suitable configurations may be used to measure backscattered light at multiple wavelengths if desired.

Figure 11:
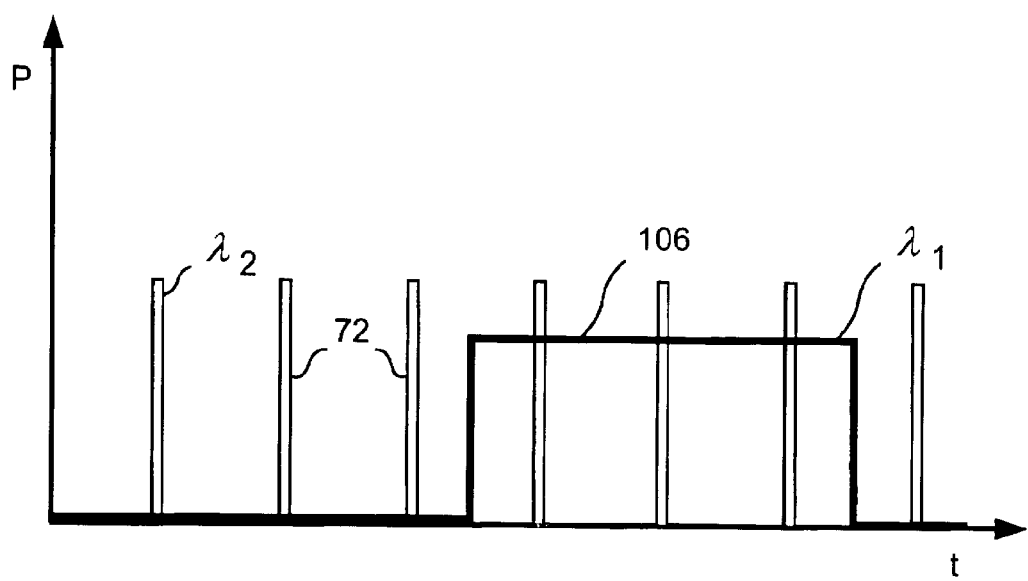
FIG. 11 is a graph showing how two Raman pump wavelengths may be modulated when making characterization measurements in a fiber-optic communications link in accordance with the present invention.

An illustrative modulation scheme that may be used by control unit 40 when performing characterizing measurements on span 16 with pump 60 is shown in FIG. 11. Pump light at $\lambda_2$ may be provided in the form of a series of pulses 72 (like the pulses 72 of FIG. 5). Optical time domain reflectometry trace data may be acquired by monitor 66b of FIG. 9 or 10 based on the backscattered signal at $\lambda_2$. At the same time, the power of the Raman pump light at $\lambda_1$ may be modulated, as shown by curve 106. Pulses 72 and signal 106 may be square pulses and square wave signals respectively. If desired, other suitable pulse or signal shapes may be used. The magnitude of the curve 106 may be varied as measurements with pulses 72 are being made.

Figure 12:
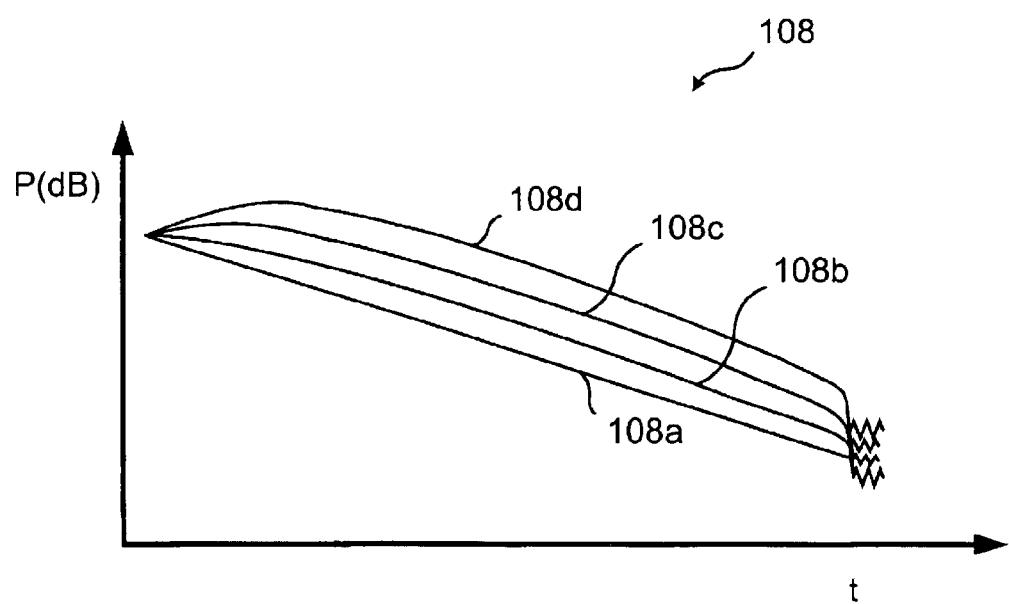
FIG. 12 is a graph showing how a set of optical time domain reflectometry measurements may be made at different Raman gain settings in accordance with the present invention.

An illustrative family of OTDR traces 108 that may be acquired using a multiwavelength Raman pump module 20 is shown in FIG. 12. Trace 108a may be acquired when the power of the pump light at $\lambda_1$ is set to zero (i.e., the magnitude of the square wave signal 106 of FIG. 11 is zero). Trace 108a may be used to characterize fiber span 16 as described in connection with FIG. 7. Traces 108b, 108c, and 108d may be acquired when using successively higher powers for the pump light at $\lambda_1$. The magnitude of the pump signal 106 at $\lambda_1$ may be increased in a stepwise fashion or may be varied continuously. Any suitable ratio may be used for the relative frequencies of the, pump light modulation signals at $\lambda_1$ and $\lambda_2$.

The family of curves 108 of FIG. 12 exhibit the effects of the Raman gain curve 84 (FIG. 8) on the OTDR pulses at $\lambda_2$. The pulses at $\lambda_2$ act as a probe signal for measuring the effects of pump 106. Control unit 40 may calculate the Raman gain coefficient of fiber 16 using information of the type contained in curves 108. Information on the Raman gain coefficient may be used by control unit 40 to automatically adjust the pump power levels produced at different wavelengths by pump 60. For example, information on the Raman gain coefficient of fiber 16 may be used to set the pump power levels to the proper levels needed to obtain a desired spectral shape and magnitude for the overall Raman gain in the signal band.

This type of automatic adjustment may be performed at any suitable time. For example, Raman pump 20 may perform these measurements and make corresponding adjustments during an initial system setup procedure, during repairs or other maintenance, following a system reconfiguration, etc. Information on the desired Raman gain spectrum that pump module 20 is to produce may be stored in control unit 40 when control unit 40 is originally configured during the manufacturing process, or may be provided to control unit 40 from the network management system over a telemetry channel or other path 24 between computer equipment 22 and module 20.

Figure 13:
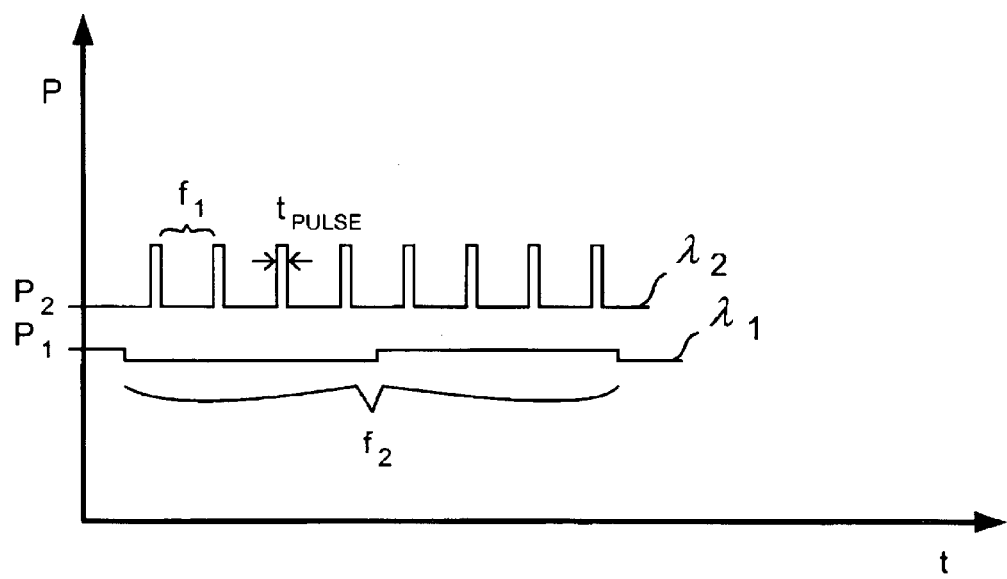
FIG. 13 is a graph showing an illustrative Raman pump modulation arrangement that may be used to measure the characteristics of a fiber span in a communications link in accordance with the present invention.

A modulation approach that may be used while link 10 is in operation carrying normal data traffic is shown in FIG. 13. Pump light at $\lambda_1$ may be varied by a relatively small modulation depth from a given level $P_1$. For example, the modulation depth of the pump light at $\lambda_1$ may be a few percent or other suitable amount. Pump light at $\lambda_1$ may be modulated at a frequency $f_2$ that is relatively slow compared with the frequency at which pulses 72 are produced. Pump light at $\lambda_2$ may be modulated to create a series of pulses 72 on top of a base pump power level $P_2$.

The modulation of the pumps may not significantly change the average pump power levels that are used to pump span 16. If desired, any changes in the average gain produced by modulating the pumps may be counteracted by adjusting the levels $P_1$ and $P_2$. Because the modulated pump light propagates in the backwards direction, whereas data signals travel in the forward direction along link 10, the impact of any noise generated by modulation of the pump light on the data signals is generally negligible. The effects of pump-induced noise may be further reduced by lowering the modulation depths of the pumps and compensating for this reduction in signal strength by making backscattered light measurements over a longer period of time.

By adjusting the magnitude of the modulation depth of the pump light at $\lambda_1$, a family of OTDR traces 108 or other suitable data of this type may be measured. This may help control unit 40 gather more accurate measurements on the characteristics of fiber 16. As an alternative, an approach may be used in which only the pump light at $\lambda_2$ is modulated, as shown in FIG. 14.

Figure 15:
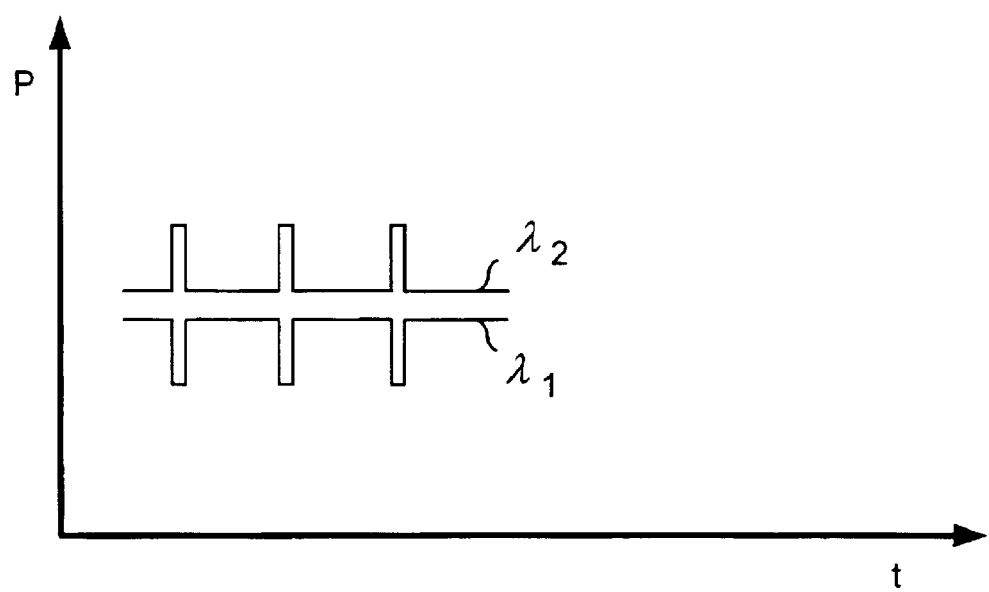
FIG. 15 is a graph that shows another illustrative Raman pump modulation arrangement that may be used to measure the characteristics of a fiber span in a communications link in accordance with the present invention.

Another illustrative pump light modulation scheme is shown in FIG. 15. With this approach, pump light signals at $\lambda_1$ and $\lambda_2$ are modulated in a complementary fashion, so that fluctuations in the magnitude of the Raman gain in fiber 16 may be minimized.

Figure 14:
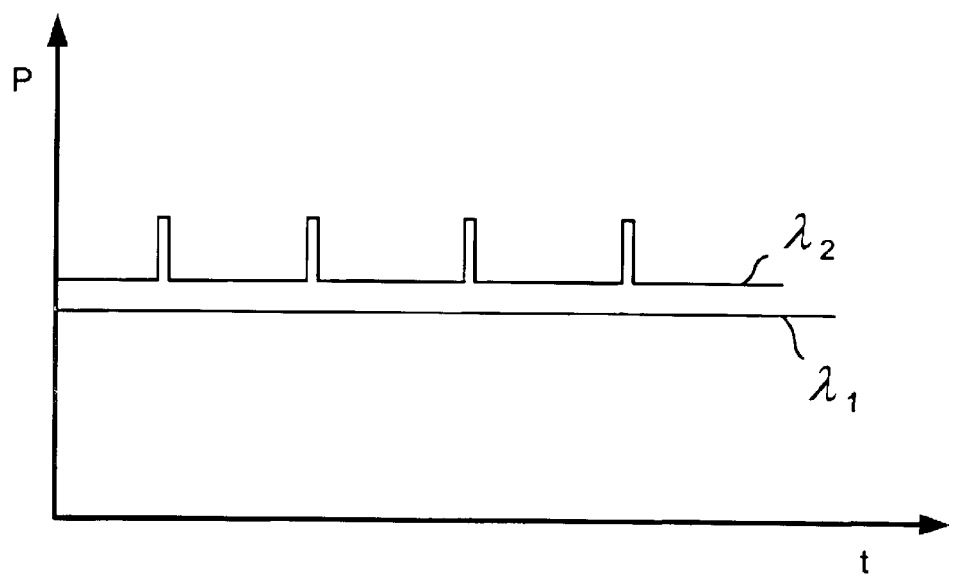
FIG. 14 is a graph showing another illustrative Raman pump modulation arrangement that may be used to measure the characteristics of a fiber span in a communications link in accordance with the present invention.

The modulation arrangements of FIGS. 13–15 are merely illustrative. Any suitable pump power modulation scheme may be used to make measurements on fiber 16. An advantage to schemes of the type shown in FIGS. 13–15 is that they tend not to disrupt the data traffic being carried on span 16. Accordingly, these schemes may be used to make OTDR measurements while pump module 20 is used to provide Raman amplification for link 10. Module 20 may gather OTDR traces and other information characterizing fiber span 16 on a continuous basis (e.g., using continuous pump power modulation), periodically (e.g., once per minute, hour, day, week, or other suitable time interval), on demand (e.g., when requested by the network management system), or when certain conditions are met (e.g., when a loss of signal condition is detected by amplifier 18 or other suitable optical monitoring equipment in the network).

The information that is gathered by using modulated pump light signals to monitor span 16 may be provided to the network management system in the form of reports, alarm signals, or data files, or as part of a data stream. The information may also be used locally by control unit 40 in automatically adjusting the operation of pump module 20 (e.g., to adjust pump powers as needed to produce a desired gain setting, or to reduce the pump power to an eye safe level, etc.).

Figure 16:
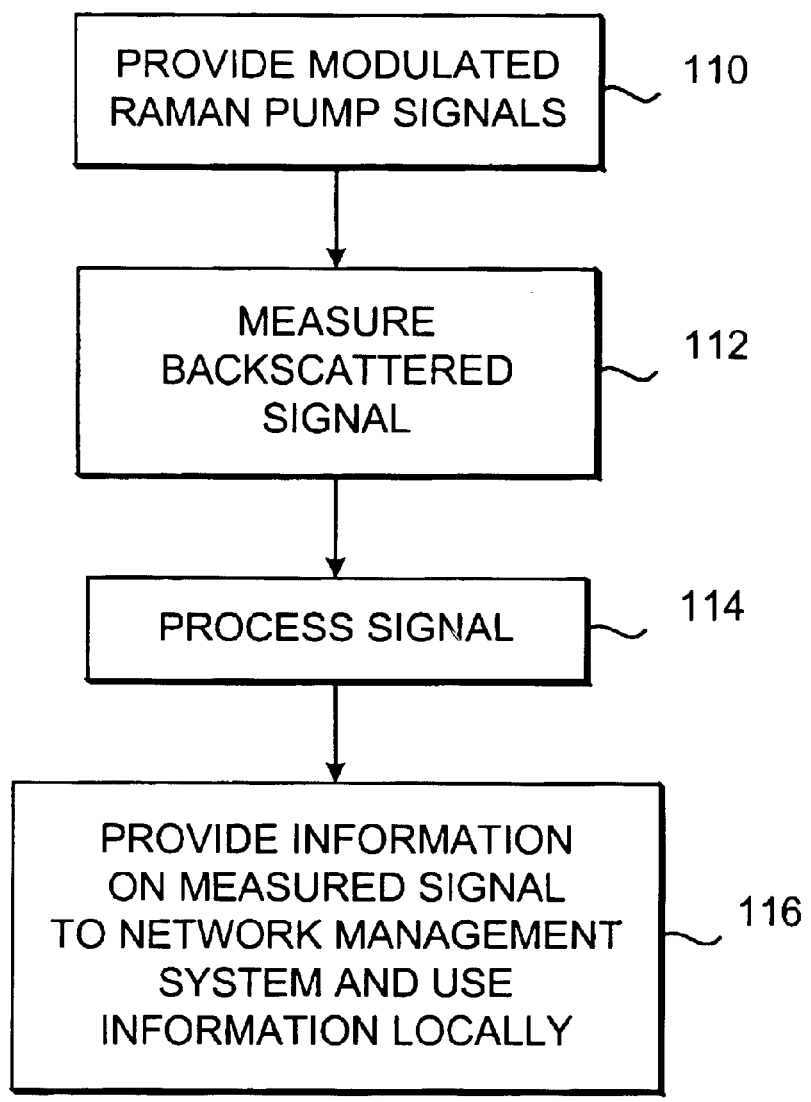
FIG. 16 is a flow chart of illustrative steps involved in using Raman pumps to measure the characteristics of a fiber span and using the results of these measurements in accordance with the present invention.

Illustrative steps involved using modulated pump light to monitor span 16 are shown in FIG. 16. At step 110, control unit 40 in Raman pump module 20 or amplifier 18 or other suitable optical amplifier or network equipment may be used to direct pump 60 to produce modulated pump light for span 16.

The backscattered signals from span 16 may be measured using optical monitors. The optical monitors may be optical monitors 66 (66a/66b) that are located in pump 20 or may be any other suitable optical monitors.

The measured backscattered signals may be processed by control unit 40 at step 114. For example, control unit 40 may use data averaging to reduce noise in the measured signal. Curve fitting, histograms, and other suitable data analysis techniques may be used to analyze and compress the data that is gathered if desired.

At step 116, control unit 40 may use the information that has been gathered and processed to adjust pump 60. For example, the powers of the pumps may be adjusted. If a fiber cut is detected, the power may be shut off as a safety precaution. Control unit 40 may also provide status information on fiber span 16 to the network management system. For example, if a cut, crack, or sudden change in bending loss is detected, control unit 40 may alert the network management system. Personnel at the network management system may then take appropriate corrective actions.

Figure 17:
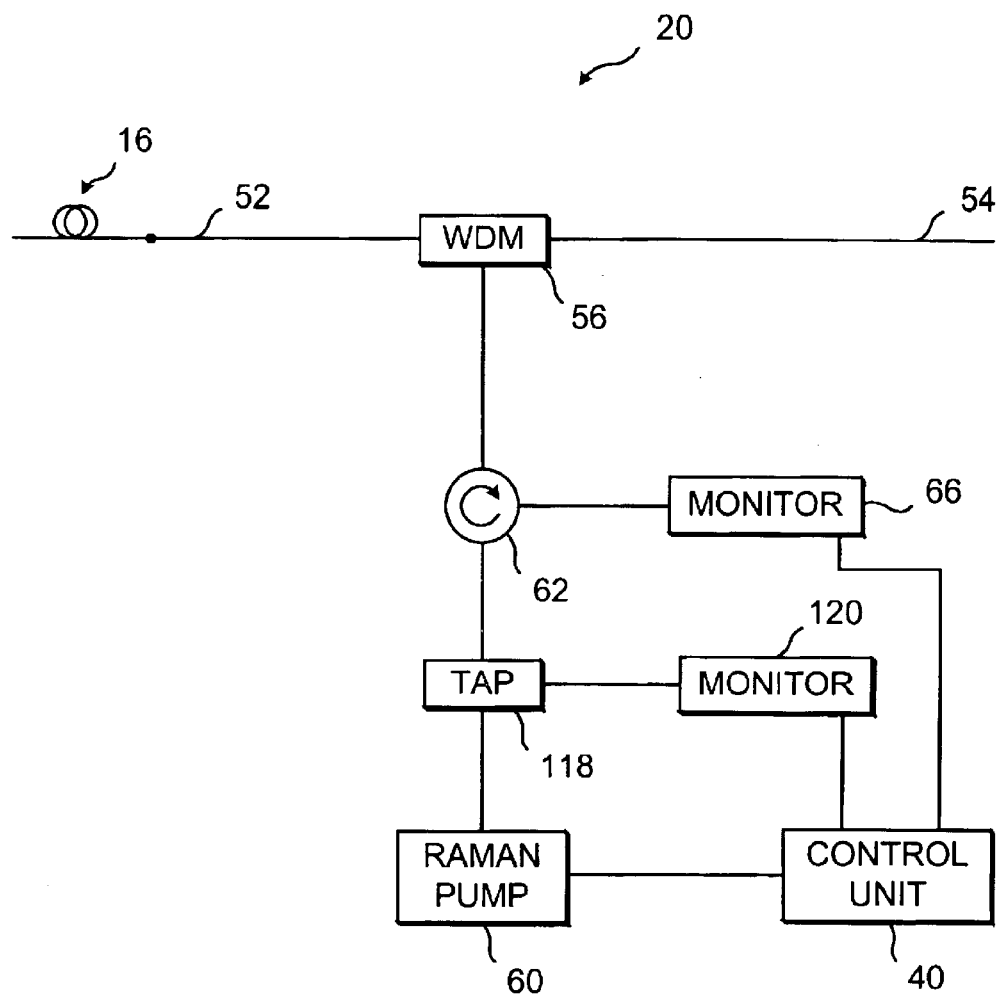
FIG. 17 is a schematic diagram showing how a tap and monitoring arrangement may be used to measure the power of Raman pump light in accordance with the present invention.

As shown in FIG. 17, module 20 may have a tap 118 and an optical monitor 120 for accurately monitoring the power being launched by Raman pump 60. This approach may be used in any suitable Raman pump module such as the modules 20 of FIGS. 3, 4, 9, and 10.

The OTDR measurements made using module 20 may be calibrated by using control unit 40 to calculate the ratio of the pump power that is launched to the reflected OTDR signal measured from a known reflective reference (e.g., a splice or a reflective device with a known calibrated reflectivity). This step allows the losses associated with components such as circulator 62 and wavelength-division multiplexer 56 to be taken into account during subsequent OTDR measurements. Calibration data from the calibration measurement may be stored by control unit 40.

During operation of module 20, control unit 40 may use tap 118 and monitor 120 to measure the Raman pump power. By using the measured Raman pump power for a given OTDR pulse and the calibration data stored in control unit 40, reflected OTDR signal measurements may be made accurately enough to determine the absolute value of the signals in trace 82 of FIG. 7, rather than just the relative trace shape. For example, control unit 40 may use the y-intercept value or extrapolated y-intercept value of trace 82 to measure the Rayleigh backscattering coefficient $\alpha_R$ at the pump wavelength. The ability to accurately measure the absolute value of the reflected signal assists control unit 40 in using measured values of PR in characterizing span 16.

The fiber span length L may be calculated using an estimated index of refraction of 1.46 (for example) and the measured OTDR time to the end of the fiber. Length measurements may be calibrated by using the network management system to request that an operator at a network management facility supply information on known distances to the fiber end or other features in a given trace 82.

Information on the fiber span length, the measured absorption coefficient of the fiber, the measured Rayleigh backscattering coefficient $\alpha_R$, the measured on-off gain at the signal wavelength, and other suitable measurements made by control unit 40 may be used to characterize the fiber span 16 for the network management system and may be used by control unit 40 in determining how to control module 20.

Regardless of whether OTDR span measurements are made during the course of normal operations or during certain times such as system setup or when a loss of signal is detected, the span measurements may provide the network management system and pump module 20 with timely information that might not otherwise be available. Such measurements may be used to monitor fiber spans 16 in metropolitan networks and long-haul and ultra-long-haul networks such as undersea networks in which timely fault detection may be of significant importance.

It will be understood that the foregoing is merely illustrative of the principles of this invention, and that various modifications can be made by those skilled in the art without departing from the scope and spirit of the invention.

What is claimed is:

1. Optical amplifier equipment that amplifies optical data signals in a fiber-optic communications link that has at least one span of transmission fiber for carrying the optical data signals, comprising:

an input fiber;

an output fiber;

a Raman pump that produces Raman pump light at first and second wavelengths to create Raman gain for the optical data signals in the span of transmission fiber, wherein the first wavelength is different than the second wavelength, wherein the Raman pump light at the first wavelength creates Raman gain for the Raman pump light at the second wavelength;

a circulator that receives the Raman pump light at the first and second wavelengths from the Raman pump;

a first wavelength-division-multiplexing coupler connected to the input fiber, the output fiber, and the circulator, wherein the Raman pump light passes from the Raman pump through the circulator, through the first wavelength-division-multiplexing coupler, and through the input fiber into the span of transmission fiber, wherein backscattered Raman pump light at the first and second wavelengths passes from the transmission fiber through the input fiber and through the first wavelength-division-multiplexing coupler into the circulator, and wherein the optical data signals pass from the transmission fiber through the input fiber, through the first wavelength-division-multiplexing coupler, and through the output fiber;

an optical monitor that measures the backscattered Raman pump light from the span of transmission fiber at the second wavelength;

a second wavelength-division-multiplexing coupler connected to the circulator that separates the backscattered Raman pump light at the first wavelength from the backscattered Raman pump light at the second wavelength, wherein the second wavelength-division-multiplexing coupler is connected to the optical monitor and wherein the backscattered Raman pump light from the span of transmission fiber at the second wavelength passes through the input fiber, through the first wavelength-division-multiplexing coupler, through the circulator, and through the second wavelength division multiplexing coupler into the optical monitor; and a control unit that uses the Raman pump and the optical monitor to perform optical time domain reflectometry measurements on the transmission fiber using a pump and probe arrangement in which the Raman pump light at the second wavelength is pulsed to perform optical time domain reflectometry measurements while the Raman pump light at the first wavelength is modulated to measure the effects of adjusting the Raman gain produced by the Raman pump light at the first wavelength in the span of transmission fiber, wherein the Raman pump light at the first wavelength is modulated at a first frequency without reducing its power to zero, wherein the Raman pump light at the second wavelength is pulsed at a second frequency without reducing its power to zero, and wherein the second frequency is greater than the first frequency.

2. The optical amplifier equipment defined in claim 1 wherein the Raman pump comprises a plurality of laser diodes operating at different pump wavelengths.